United States Patent
Eide et al.

(10) Patent No.: US 6,529,978 B1
(45) Date of Patent: Mar. 4, 2003

(54) COMPUTER INPUT/OUTPUT (I/O) INTERFACE WITH DYNAMIC I/O ADAPTOR PROCESSOR BINDINGS

(75) Inventors: Curtis Shannon Eide, Rochester, MN (US); Gregory Michael Nordstrom, Oronoco, MN (US); William Alan Thompson, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/511,506

(22) Filed: Feb. 23, 2000

(51) Int. Cl.⁷ .............................. G06F 13/00; G06F 3/00; G06F 9/00
(52) U.S. Cl. ................................ 710/104; 710/8; 713/1; 713/2; 713/100
(58) Field of Search ................................ 710/305, 302, 710/300, 8–19, 100, 301, 303, 304, 104; 713/1, 2, 100

(56) References Cited

U.S. PATENT DOCUMENTS

| | | | |
|---|---|---|---|
| 5,430,855 A | 7/1995 | Walsh et al. | 395/275 |
| 5,655,148 A | 8/1997 | Richman et al. | 395/828 |
| 5,666,557 A | 9/1997 | Cassidy et al. | 395/828 |
| 5,751,975 A | 5/1998 | Gillespie et al. | 395/306 |
| 5,764,930 A | 6/1998 | Staats | 395/287 |
| 5,781,798 A | 7/1998 | Beatty et al. | 395/830 |
| 5,784,644 A | 7/1998 | Larabell | 395/829 |
| 5,793,997 A | 8/1998 | Briggs | 395/309 |
| 5,819,107 A | 10/1998 | Lichtman et al. | 395/828 |
| 5,832,238 A | 11/1998 | Helms | 395/285 |
| 5,857,083 A | 1/1999 | Venkat | 395/309 |
| 5,889,965 A | 3/1999 | Wallach et al. | 395/283 |
| 5,974,544 A | 10/1999 | Jeffries et al. | 713/1 |
| 6,023,736 A * | 2/2000 | Lambeth et al. | 710/10 |
| 6,058,445 A | 5/2000 | Chari et al. | 710/103 |
| 6,134,616 A | 10/2000 | Beatty | 710/104 |
| 6,148,355 A | 11/2000 | Mahalingam | 710/104 |
| 6,175,932 B1 | 1/2001 | Foote et al. | 714/9 |
| 6,192,434 B1 | 2/2001 | Wallach et al. | 710/103 |
| 6,243,774 B1 * | 6/2001 | Eide et al. | 710/302 |

OTHER PUBLICATIONS

"AS/400 Advanced Series 9404/9406 Models 5xx Problem Analysis, Repair and Parts", *International Business Machines Doc. No. SY44–4951–01*, (1996).

Bakke, B.E. et al., "Method for Atomic Peer–to–Peer Communication on a Peripheral Component Interconnect Bus", *IBM® Technical Disclosure Bulletin*, vol. 39, No. 01 (Jan. 1996).

* cited by examiner

*Primary Examiner*—Peter Wong
*Assistant Examiner*—Tim Vo
(74) *Attorney, Agent, or Firm*—Wood, Herron & Evans LLP

(57) ABSTRACT

An apparatus, program product and method to dynamically control the bindings between Input/Output Adaptors (IOA's) and Input/Output Processors (IOP's) in a hierarchical I/O interface of a computer, such that an IOA can be dynamically reassigned from one IOP to another IOP such that the latter IOP takes over management of data transfer between the processing complex of the computer and the IOA from the former IOP. At least partial system availability is maintained in the computer during dynamic reassignment to minimize system downtime and simplify maintenance operations on the computer.

20 Claims, 8 Drawing Sheets

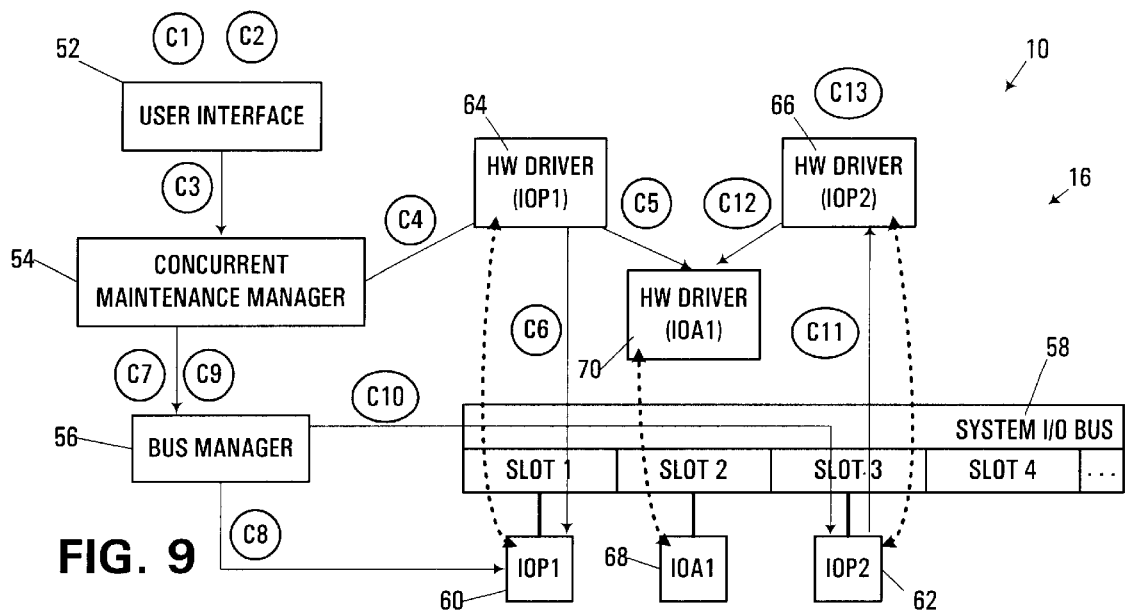

FIG. 9

```
114
                    WORK WITH CONTROLLING RESOURCE
                                                                    FRAME ID 2
   SELECTED RESOURCE:                    RESOURCE       CARD    DEVICE
          DESCRIPTION        TYPE-MODEL  NAME           POS     POS
          WORKSTATION IOA    * >  2722-001  C25         C08

TYPE OPTIONS, PRESS ENTER.
          5 = DISPLAY DETAIL    7 = ASSIGN TO    8 = ASSOCIATED LOGICAL RESOURCE(S)

RESOURCE
   OPT    DESCRIPTION          TYPE-MODEL   STATUS      NAME
   7      MULTIPLE FUNCTION IOP       2842-001   OPERATIONAL   CMB03
          MULTIPLE FUNCTION IOP  * >  2842-001   OPERATIONAL   CMB04

F3 = EXIT    F5 = REFRESH    F6 = PRINT    F12 = CANCEL
```

FIG. 11

COMPUTER INPUT/OUTPUT (I/O) INTERFACE WITH DYNAMIC I/O ADAPTOR PROCESSOR BINDINGS

FIELD OF THE INVENTION

The invention is generally related to computers and computer software. More specifically, the invention is related to computer interfaces with peripheral devices and the maintenance thereof.

BACKGROUND OF THE INVENTION

Computer interfaces typically include hardware and/or software designed to communicate information from one system of hardware and/or software to another. One principal use of computer interfaces is in enabling communication between the primary processing complex (i.e., the "brains") of a computer and one or more peripheral or external components or devices that enable the computer to communicate with the outside world. Given the wide variety of types of peripheral or external devices, as well as the variety of hardware designs utilized for such device types, often a computer will utilize an input/output (I/O) interface to simplify the interconnection and communication between the computer and such devices.

For example, one type of I/O interface utilized by some midrange, mainframe and other multi-user computer systems is a hierarchical input/output (I/O) interface. In a hierarchical I/O interface, devices such as computer networks, workstations, storage devices, display devices, etc. are interfaced with the processing complex of a computer through a hierarchical arrangement of input/output adaptors (IOA's) and input/output processors (IOP's).

An IOA generally refers to the interface control logic for a peripheral component that implements a particular type of connection, e.g., Ethernet, RS232, twinaxial, SCSI, etc. Often an IOA will also incorporate the physical connector required to connect the peripheral component to the system. IOA's are typically fairly simple, and often lack powerful processors and large arrays of memory. An IOP, on the other hand, typically includes a relatively complex processor and an appreciable amount of memory, and is used to interface one or more IOA's with the processing complex (e.g., the system processor) of a computer to offload much of the I/O related work (e.g., interrupts, buffering, etc.) from the processing complex. An IOP also typically encapsulates the specifics of the IOA's with which the IOP is interfaced to provide a more uniform interface to the processing complex.

By allocating I/O processing to a processor separate from the primary processing complex of a computer, significant performance gains are often realized, since the processing complex can be freed from having to directly handle the timeconsuming operations associated with I/O data transfers and interrupt handling. Moreover, IOP's typically provide a highly configurable and flexible interface for peripheral components, since much of the interface logic can be implemented in software that is executed by the IOP's. As a result, device-specific operations can be "wrapped" to provide a common software interface that effectively permits an application executing on a computer to access a peripheral component without any special regard for the specific intricacies of the underlying hardware.

Typically, a hierarchical I/O interface utilizes "bindings" between IOP's and IOA's, whereby each IOP is assigned responsibility for handling the interface between the computer and one or more IOA's. So that the overall performance of the computer is maximized, often attempts are made to balance IOP workloads and ensure that responsibility for IOA's is distributed as equally as possible between multiple IOP's. Otherwise, some IOP's may become overtaxed and slow down the system, while other IOP's may be underutilized and thus waste available processing capacity.

In some conventional hierarchical I/O interfaces, the bindings between IOP's and IOA's are more or less static—that is, once the bindings are established, they are relatively difficult and cumbersome to change. Moreover, the bindings are often based upon the relative locations and types of IOA's and IOP's in a computer. In some instances, however, it may be desirable to change the bindings between IOP's and IOA's, e.g., upon failure of an IOP, or if the workloads of different IOP's are significantly unbalanced.

Typically, IOP's handle specific I/O ports (or locations) in a computer, e.g., specific card slots on an interface bus, so that a particular IOP is assigned to handle any IOA's physically connected to one or more I/O ports in the computer. As a result, transferring responsibility for an IOA from one IOP to another typically requires that the IOA be physically removed from one location and replaced in another location in the computer.

At a minimum, moving an IOA requires physical access to the computer. More typically, moving an IOA requires that at least a portion of the computer be shut down and rebooted. In many multi-user computer environments, however, system availability is a critical requirement, and as such the inability to access a computer for any amount of time may have a significant impact on the productivity of a relatively large number of users. In many mission-critical applications, no system downtime is acceptable, and as such, changing bindings between IOA's and IOP's is effectively not supported.

Therefore, a significant need exists in the art for a manner of changing the bindings between IOA's and IOP's in a hierarchical I/O interface with minimal impact on system availability.

SUMMARY OF THE INVENTION

The invention addresses these and other problems associated with the prior art by providing an apparatus, program product and method in which the bindings between IOA's and IOP's in a hierarchical I/O interface of a computer can be dynamically controlled, and while maintaining at least partial system availability. Specifically, embodiments consistent with the invention support the dynamic reassignment of an IOA in a hierarchical I/O interface from one IOP to another IOP such that the latter IOP takes over management of data transfer between the processing complex of the computer and the IOA from the former IOP.

At least partial system availability is maintained during dynamic reassignment of an IOA to an IOP in embodiments consistent with the invention. As such, the management of hardware resource such as IOA's and IOP's can be performed with reduced system downtime, and often with less invasive maintenance procedures, since in many instances physical access to computer hardware is not required. In addition, in some embodiments of the invention, dynamic reassignment can occur without any attendant change in location of any IOA or IOP.

Furthermore, in some embodiments of the invention, dynamic reassignment of IOA's can be performed in response to detected failures for given IOP's, such that the failure in one IOP can be quickly and easily remedied through reassignment of any IOA's previously managed by the failed IOP to different, operational IOP's. In other embodiments of the invention, system performance can be monitored, and the bindings between IOA's and IOP's dynamically reassigned to maximize performance, e.g., by better balancing the workloads of multiple IOP's.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DESCRIPTION OF THE DRAWINGS

FIG. 9 is a block diagram illustrating the data flow between software components in the computer of FIG. 1 during an I/O adaptor reassignment operation.

FIG. 11 is a block diagram of a representative user interface display for use in interacting with a user during the I/O adaptor reassignment operation illustrated in FIGS. 9 and 10.

DETAILED DESCRIPTION

Hardware and Software Environment

Figure 1:
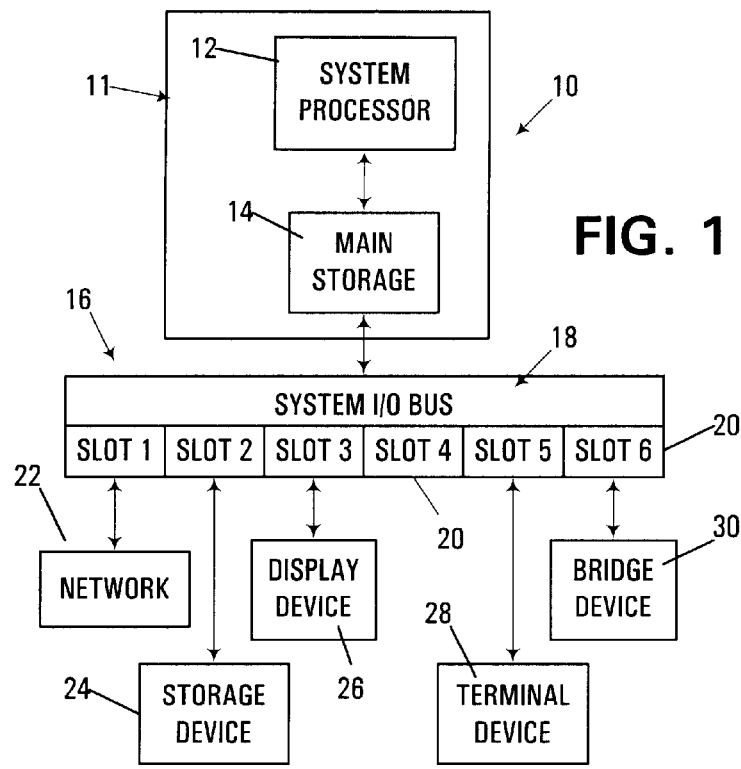
FIG. 1 is a block diagram of a computer consistent with the invention.

Turning to the Drawings, wherein like numbers denote like parts throughout the several views, FIG. 1 illustrates an apparatus 10 consistent with the invention. Apparatus 10 will hereinafter also be referred to as a "computer" or "computer system", although it should be appreciated the term "apparatus" may also include other suitable programmable electronic devices consistent with the invention. For the purposes of the invention, apparatus 10 may represent practically any type of computer, computer system or other programmable electronic device, including a client, or single-user, computer such as a workstation, desktop computer or portable computer; or a multi-user computer such as a mainframe computer, a midrange computer, a supercomputer, or a network server, among others. Apparatus 10 may be coupled to other electronic devices over a network, or may be a stand-alone device in the alternative.

Apparatus 10 includes a processing complex 11 including a system processor 12 coupled to a main storage 14. In the illustrated embodiment, apparatus 10 is an AS/400 midrange computer available from International Business Machines Corporation. However, it should be appreciated that any number of alternate environments may utilize the concepts disclosed herein, and thus, the invention should not be limited to use with any particular computing environment.

Processor 12 may represent one or more processing devices (e.g., microprocessors), and main storage 14 may represent the dynamic random access memory (DRAM) devices comprising the primary work space of apparatus 10, as well as any supplemental levels of memory, e.g., cache memories, non-volatile or backup memories (e.g., programmable or flash memories), read-only memories, etc. In addition, main storage 14 may be considered to include memory storage physically located elsewhere in apparatus 10, e.g., any cache memory in a processor 12, as well as any storage capacity used as a virtual memory, e.g., as stored on a storage device coupled to the computer.

External communication with apparatus 10 is handled through an input/output (I/O) interface 16 coupled to processing complex 11. I/O interface 16 is illustrated as including a system I/O bus 18 including a plurality of locations 20 (also referred to herein as "slots"), which provides an interface with various hardware peripheral devices, e.g., as illustrated at 22–30. Each location 20 on bus 18 is configured to receive an input/output processor (IOP) or input/output adaptor (IOA) (not shown in FIG. 1), although in other embodiment specific locations in I/O interface 16 may only be capable of receiving IOP's or IOA's. Further, in other embodiments, IOP's and IOA's may be interfaced with the processing complex via separate buses or other interconnect mechanisms.

An IOP consistent with the invention can include one or more microprocessors or micro controllers incorporating any attendant support circuitry such as memories, I/O hardware, buffers, drivers, power supply circuitry etc., typically disposed on a single circuit board. An IOP may be capable of being used with different types of peripherals (e.g., multi-function IOP's), or may be specifically tailored for use with only one type of peripheral. An IOA consistent with the invention can include like hardware, and further may include additional circuitry suitable for the particular peripheral device controlled thereby, e.g., storage control circuitry for a storage adaptor, display driving circuitry for a display adaptor, communication driver circuitry for a network adaptor, workstation control and bus communication driver circuitry for a workstation adaptor, etc. An IOA may interface with practically any type of peripheral device capable of communicating with apparatus 10 consistent with the invention.

It should also be appreciated that I/O interface 16 may include multiple buses, as well as extensions and interfaces to additional buses for connecting with additional peripheral devices. Moreover, it should be appreciated that the invention should not be limited to use in the bus and slot environment disclosed herein. Rather, any combination of single- and/or multi-drop interconnections that define multiple locations at which peripheral devices may be installed may be used consistent with the invention. As such, an IOP or IOA need not necessarily be disposed on an interface card as described herein.

In addition, any number of hardware devices may be coupled to I/O interface 16 consistent with the invention. For example, an interface to a network 22 may be provided, e.g., to provide communications capability using any number of network protocols (e.g., IPX, TCP/IP, SNA, etc.). Also, an interface may be provided to a storage device 24 such as a DASD, an optical drive, a floppy drive, a hard disk drive, and/or a tape drive, as well as to a display device 26 such as a video display, an LCD panel, etc. Also, control over one or more terminal devices 28 such as attached workstations may be provided, and an interface to an expansion bus may be provided by a bridge device 30. It should be appreciated that practically any other programmable electronic device that is capable of interfacing and communicating with apparatus 10 may be used as a peripheral device consistent with the invention.

Figure 2:
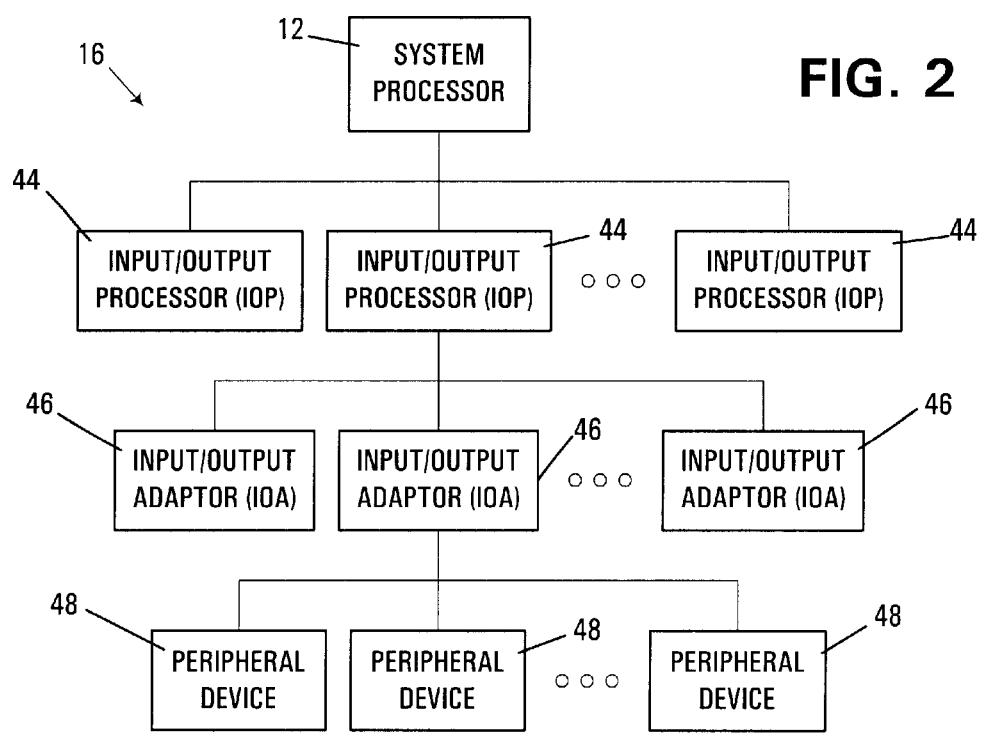
FIG. 2 is a block diagram illustrating an exemplary hierarchical input/output (I/O) interface utilized by the computer of FIG. 1.

As discussed above, each location on bus 20 is capable of receiving an IOP or IOA, typically implemented on an interface card or circuit board. As shown in FIG. 2, I/O interface 16 herein is implemented as a hierarchical interface whereby a hierarchical arrangement of IOP's 44 and IOA's 46 is utilized to interface a plurality of peripheral devices 48 with the primary processing complex of apparatus 10, represented by system processor 12. Depending upon the particular configuration, it will be appreciated that any number of peripheral devices 48 can be controlled by an IOA 46, and any number of IOA's 46 can be bound to an IOP 44, Moreover, any number of IOP's 44 can be supported in a given computer system consistent with the invention.

Returning to FIG. 1, Apparatus 10 generally operates under the control of an operating system, and executes various computer software applications, components, programs, objects, modules, etc. Moreover, various applications, components, programs, objects, modules, etc. may also execute on one or more processors in another electronic device coupled to apparatus 10, e.g., in a distributed or client-server computing environment, whereby the processing required to implement the functions of a computer program may be allocated to multiple devices over a network.

In general, the routines executed to implement the embodiments of the invention, whether implemented as part of an operating system or a specific application, component, program, object, module or sequence of instructions will be referred to herein as "computer programs", or simply "programs". The computer programs typically comprise one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, optical disks (e.g., CD-ROM's, DVD's, etc.), among others, and transmission type media such as digital and analog communication links.

In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Those skilled in the art will recognize that the exemplary environment illustrated in FIG. 1 is not intended to limit the present invention. Indeed, those skilled in the art will recognize that other alternative hardware and/or software environments may be used without departing from the scope of the invention.

Dynamic Binding of IOA's to IOP's in a Hierarchical I/O Interface

As discussed above, various embodiments of the invention operate by supporting the capability to dynamically modify the binding between an IOA and an IOP in a hierarchical I/O interface. Put another way, the various embodiments of the invention support bindings between IOA's and IOP's that can be changed without having to power off any portion of a computer, and without having to physically move any IOA or IOP. As a result, dynamic bindings may be controlled entirely with software and without user intervention, with no physical access to the computer required, and without any system down time in terms of powering off (although, as will become more apparent below, jobs that rely on IOA's may need to be ended). Such dynamic modifications between IOA's and IOP's may be supported, for example, through program code implemented within an operating system executed by apparatus 10.

The discussion hereinafter will focus on a specific implementation of the invention in the environment of an AS/400 midrange computer, and specifically within the System Licensed Internal Code (SLIC) of the OS/400 operating system. It will be appreciated, however, that the invention may be implemented in an innumerable number of other applications and environments.

Figure 3:
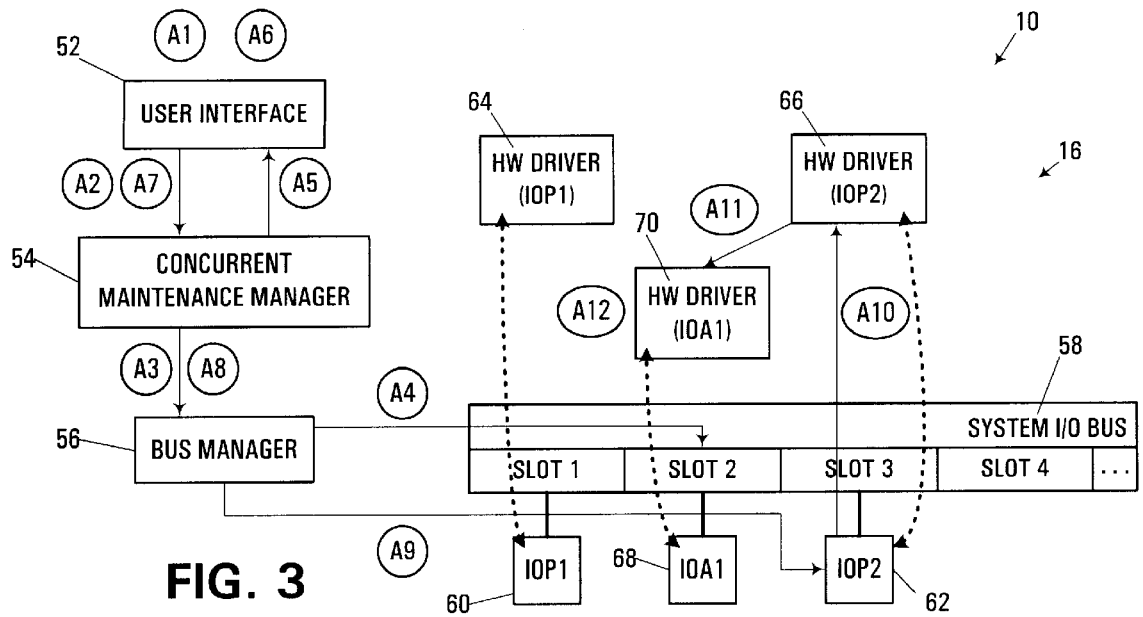
FIG. 3 is a block diagram illustrating the data flow between software components in the computer of FIG. 1 during an I/O adaptor assignment operation performed responsive to power on of an I/O adaptor.

As shown in FIG. 3, apparatus 10 is illustrated as incorporating a plurality of software components that implement the dynamic binding capability of I/O interface 16. A user interface component 52 receives input from a user. A concurrent maintenance (CM) manager component 54 is used to handle concurrent maintenance operations (of which dynamic binding of IOA's to IOP's is an example) in response to user input supplied through user interface 52 and/or through direct software control provided by another software component or application. A bus manager component 56 handles control of a system I/O bus component 58, which coordinates the low level communications within I/O interface 16. Outside of the additional logic incorporated to implement dynamic binding, the use and configuration of user interface, concurrent maintenance manager and bus manager components in the OS/400 operating system are known in the art.

Apparatus 10 includes a plurality of hardware resources and associated software representations thereof, e.g., a pair of IOP hardware resources 60, 62 (IOP1 and IOP2) and associated hardware drivers 64, 66, and an IOA hardware resource 68 (IOA1) and associated hardware driver 70. Dashed lines are used in FIG. 3 to represent logical communication pipes between the resources and the drivers therefor.

One implementation of the low level management of hardware resource such as IOP's and IOA's is discussed in greater detail in copending U.S. patent applications Ser. No. 09/106,949 and 09/107,768, each of which was filed on Jun. 30, 1998, and Ser. No. 08/995,157, which was filed on Dec. 19, 1997. The disclosures of each of these applications are incorporated by reference herein.

Figure 5:
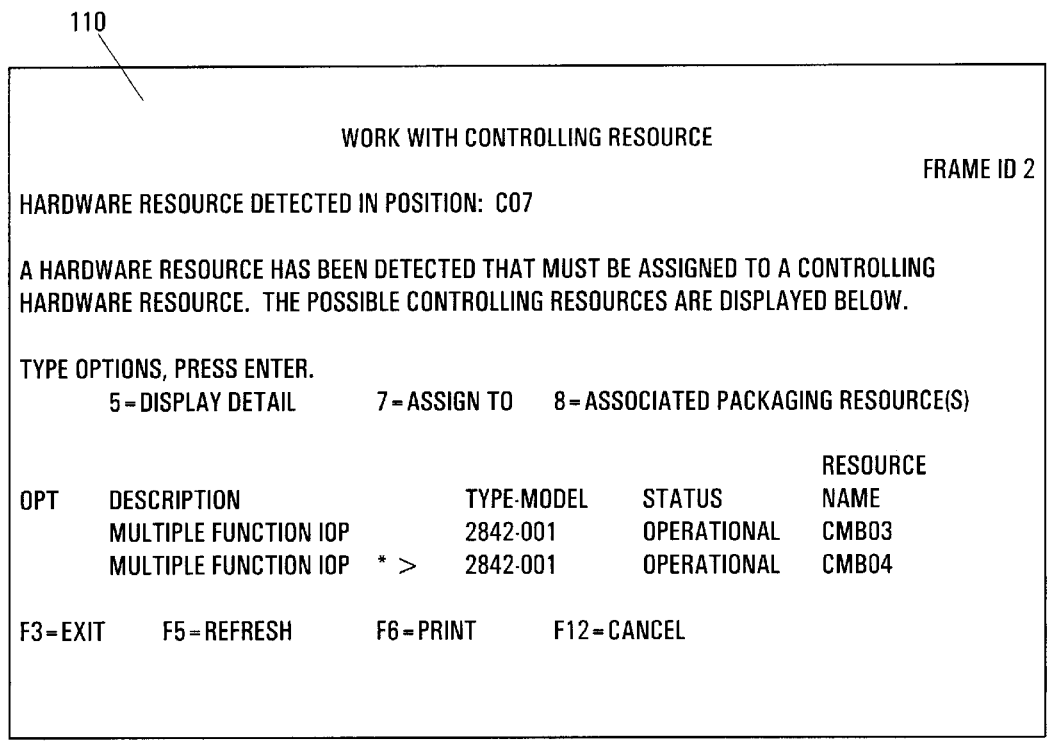
FIG. 5 is a block diagram of a representative user interface display for use in interacting with a user during the I/O adaptor assignment operation illustrated in FIGS. 3 and 4.
Figure 4:
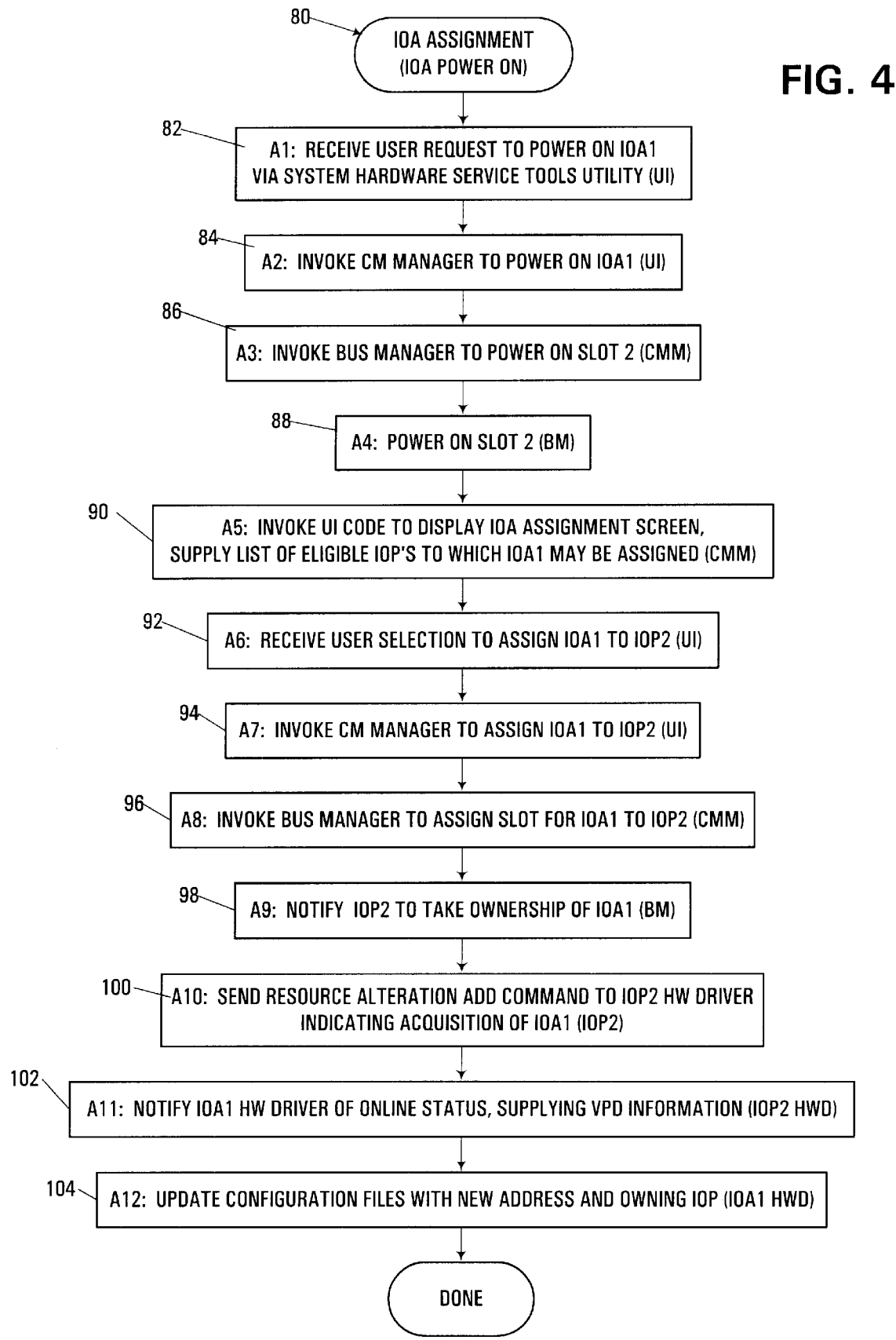
FIG. 4 is a flowchart illustrating the program flow of the software components of FIG. 3 during the I/O adaptor assignment operation.
Figure 6:
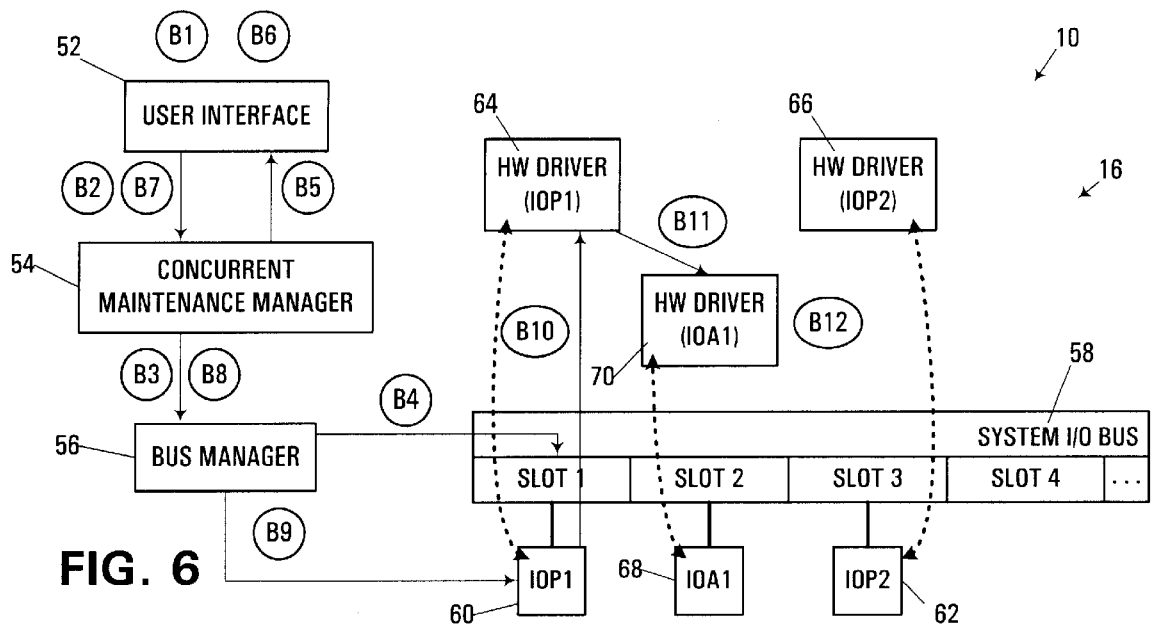
FIG. 6 is a block diagram illustrating the data flow between software components in the computer of FIG. 1 during an I/O adaptor assignment operation performed responsive to power on of an I/O processor.
Figure 8:
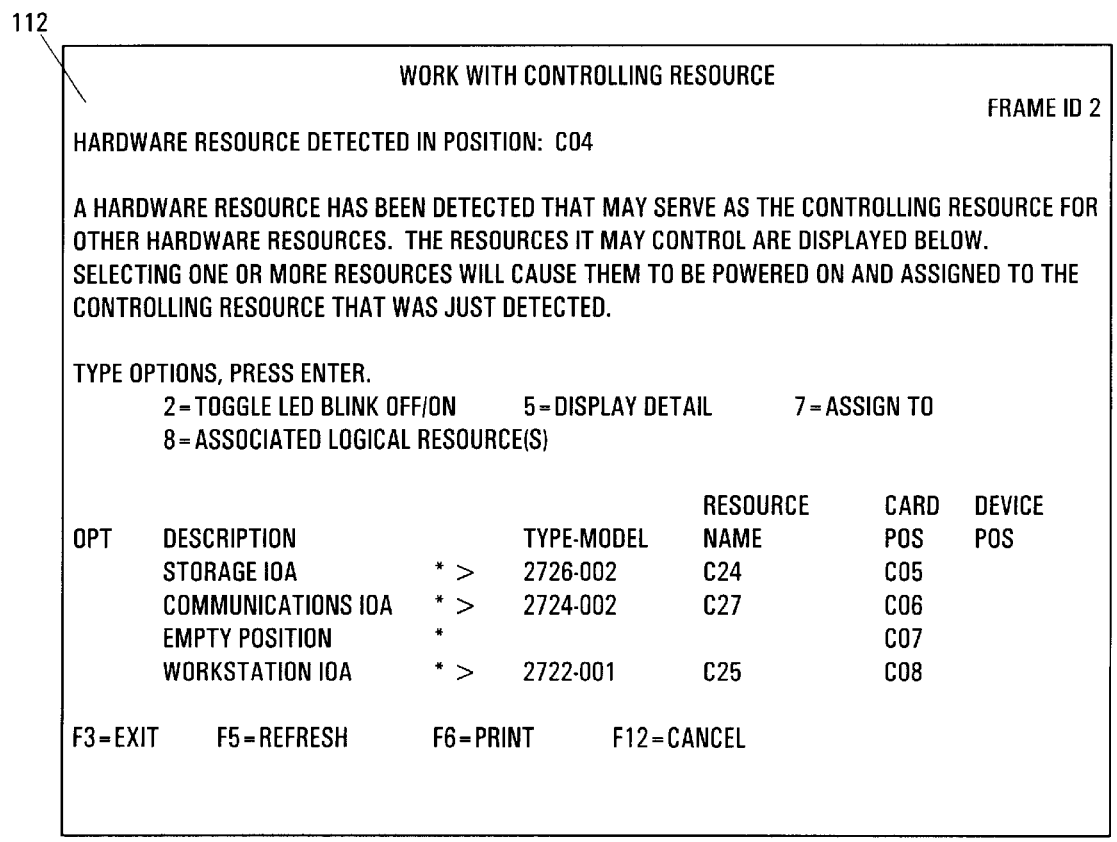
FIG. 8 is a block diagram of a representative user interface display for use in interacting with a user during the I/O processor power on and I/O adaptor assignment operation illustrated in FIGS. 6 and 7.
Figure 7:
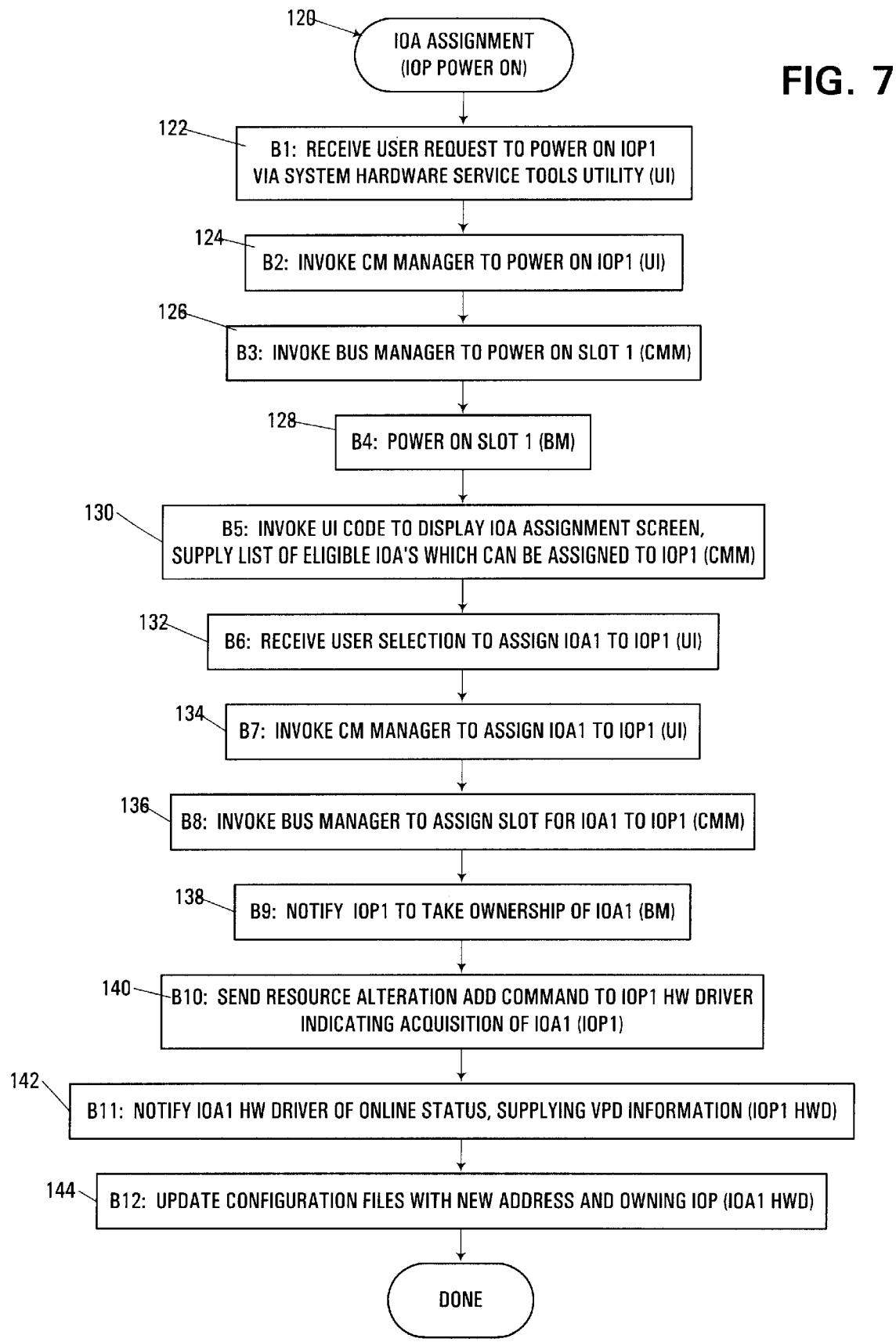
FIG. 7 is a flowchart illustrating the program flow of the software components of FIG. 6 during the I/O processor power on operation.
Figure 10:
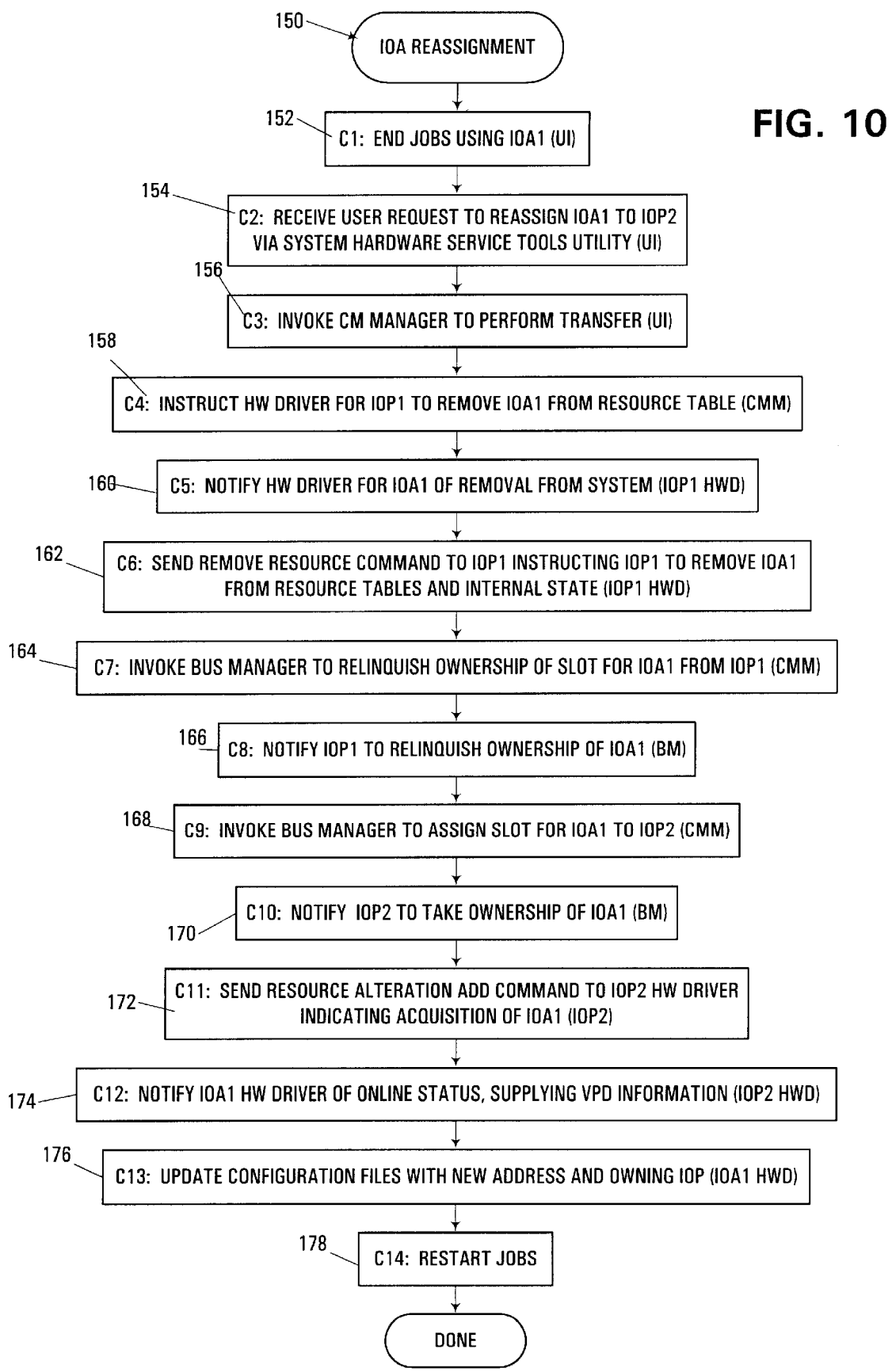
FIG. 10 is a flowchart illustrating the program flow of the software components of FIG. 9 during the I/O adaptor reassignment operation.

To support dynamic resource binding consistent with the invention, a number of support services are required. FIGS. 3–5, for example, illustrate an IOA assignment routine that is initiated in response to power on of an IOA in apparatus 10. FIGS. 6–8 illustrate the operations that occur in an IOA assignment routine performed in response to power on of an IOP. FIGS. 9–11 illustrate the operations that occur in an IOA reassignment routine performed while apparatus 10 is fully operational (i.e., with all of the relevant IOA's and IOP's in operational status). It will be appreciated that additional support services may be provided consistent with the invention.

It will be appreciated that when a system I/O bus is powering on, such as during system initial program load (IPL), the IOA's attached to the bus are initially bound to IOP's based upon persistent records of bindings the last time the bus was powered on. If no persistent records exist, e.g., during a system's very first IPL, or if this is the system's first IPL with a particular bus connected, a set of default rules are typically used to assign IOA's to IOP's. Typically, the default assignment rules will assign certain IOP's to handle certain slots on the bus, e.g., by assigning IOA's to the nearest upstream IOP's in an internal buslot numbering scheme. Other default rules, however, may also be used in the alternative, e.g., assigning IOA's to the nearest downstream IOP's, dividing the number of IOA's by the number of IOP's and assigning such that IOA's are balanced across IOP's, etc.

It is also important to note that, in the illustrated embodiments, at least partial system availability is maintained during assignment and reassignment operations. Specifically, in the embodiments discussed hereinafter, only the IOA's specifically involved in a particular assignment or reassignment operation are made unavailable to the processing complex of the computer. Other IOA's assigned to an IOP involved in an assignment or reassignment operation need not be affected.

Furthermore, in the illustrated embodiments, reassignment operations can often be performed without changing the location of any IOA or IOP, given that the bindings between IOA's and IOP's are typically location independent. It should be appreciated, however, that in some embodiments, an I/O interface may be partitioned into separate functional components, e.g., separate buses, where only a subset of the IOP's in the system are capable of managing IOA's disposed at given locations in the computer. Nonetheless, the underlying bindings are typically not tied directly to particular locations in the I/O interface.

Now turning to FIG. 4, the operation of an IOA assignment routine 80 performed in response to power on of an IOA is described. FIG. 4 is cross-referenced with FIG. 3 so as to indicate which of the software components in FIG. 3 performs each step in routine 80, via the Ax designations in FIGS. 3 and 4.

Routine 80 is typically initiated in response to detection of a user request to power on, or activate, an IOA (here IOA1) via a system hardware service tools utility supported by user interface 52 (block 82). Responsive to the request, in block 84 the user interface invokes the concurrent maintenance manager to power on IOA1. Next, in block 86, the concurrent maintenance manager invokes the bus manager to power on slot 2 on system bus 58 and thereby apply power to IOA1. In response, bus manager 56 powers on slot 2 in system bus 58 (block 88).

Next, in block 90, the concurrent maintenance manager invokes code in the user interface 52 to display an IOA assignment screen to the user, with a list of eligible IOP's to which IOA1 may be assigned supplied to the UI code. Next, in block 92, the user interface receives the user selection to assign IOA1 to one of the available IOP's (e.g., IOP2 in this example).

Next, in block 94, the user interface invokes the concurrent maintenance manager to assign IOA1 to IOP2, and in block 96, the concurrent maintenance manager invokes bus manager 56 to assign the current slot for IOA1 (slot 2) to IOP2.

Next, the bus manager notifies IOP2 to take ownership of IOA2, and in block 100, IOP2 sends a "resource alteration add" command to the hardware driver associated with IOP2 to indicate the acquisition of IOA1. Next, in block 102, the IOP2 hardware driver notifies the IOA1 hardware driver of IOA1's online status, supplying vital product data (VPD) information to the IOA1 hardware driver. Next, in block 104, the hardware driver for IOA1 updates its configuration files with its new address and owning IOP. IOA1 is then operational, and IOP2 is configured to handle the interface with IOA1. Routine 80 is therefore complete.

Next, turning to FIG. 5, an exemplary IOA assignment screen 110 is illustrated, based upon a command line-type interface as supported by the AS/400 computer. As represented in the display, the user interface provides a list of available IOP's to which a new IOA can be assigned. The IOA being powered on is shown in card position C07, as indicated near the top of the display. The IOP's that this IOA can be bound, or assigned to, are listed near the bottom of the display. If an IOA existed in the same card position the last time it was powered on, the IOP to which that IOA was assigned is designated by the ">" symbol, to facilitate IOA replaces and upgrades where the user does not wish to assign the IOA to a different IOP. The system default selection is designated by the "*" symbol. From this display, the user may specify option 7 next to the IOP to which he or she wishes the IOA to be bound.

It will be appreciated that alternate user interfaces may be utilized to obtain assignment information from a user, including various text and graphical user interface methodologies. Moreover, as will become more apparent from the description of FIGS. 12 and 13, a programming interface may also be supported whereby specific applications, daemon's or other software jobs may also invoke the various functionalities supported herein. Other modifications will be apparent to one of ordinary skill in the art.

Now turning to FIGS. 6 and 7, the operations performed to assign IOA's to an IOP being powered on are illustrated in routine 120 (FIG. 7), with the data flow and software components handling the various steps in the routine cross-referenced via the Bx designations in FIGS. 6 and 7.

Routine 120 begins in block 122 where the user interface receives a user request to power on an IOP via a system hardware service tools utility (here IOP1). Next, in block

124, the user interface invokes the concurrent maintenance manager to power on IOP1. Next, in block 126, the concurrent maintenance manager invokes the bus manager to power on slot 1, the slot within which IOP1 is installed.

Next, in block 128, the bus manager powers on slot 1, and in block 130, the concurrent maintenance manager invokes program code in the user interface component to display an IOA assignment screen, supplying a list of eligible IOA's that can be assigned to IOP1 to the user interface component.

Next, in block 132, the user interface component receives a user selection to assign IOA1 to a particular IOP (here IOP1), and in block 134, the user interface component invokes the concurrent maintenance manager to assign IOA1 to IOP1. Next, in block 136, the concurrent maintenance manager invokes the bus manager to assign the slot for IOA1 (slot 2) to IOP1, and in response, the bus manager notifies IOP1 to take ownership of IOA1 in block 138. Next, in block 140, IOP1 sends a "resource alternation add" command to hardware driver associated with IOP1, indicating its acquisition of IOA1. Next, in block 142, the IOP1 hardware driver notifies the IOA1 hardware driver of its online status, supplying VPD information thereto. Next, in block 144, the IOA1 hardware driver updates its configuration files with the address and owning IOP. IOA1 is then assigned to IOP1, and routine 120 is complete.

An exemplary command-line display 112 is illustrated in FIG. 8, noting that a new IOP1 is being powered on in card position C04 with the IOA's that could be bound to this IOP listed near the bottom of the display. If an IOP existed in the same card position the last time it was powered on, the IOA's that were assigned to that IOP are designated by the ">" symbol, and IOA's designated by the "*" symbol are system default selections. From this display, the user may specify option 7 next to the IOA's he or she wishes to assign to the IOP.

Next turning to FIGS. 9 and 10, the operations that occur in response to an IOA reassignment routine 150 are illustrated in greater detail, with cross-references between FIGS. 9 and 10 indicated by the Cx designations.

Starting at block 152, prior to reassigning an IOA, a user is required to end any jobs that utilize the IOA, typically performed through a job/work management utility. Next, in block 154, the user interface receives a user request to reassign IOA1 to another IOP (here IOP2) via a system hardware service tools utility. Next, in block 156, the user interface invokes the concurrent maintenance manager to perform the transfer, providing the IOA to be assigned, the current owning IOP, and the new owning IOP.

Next, in block 158, the concurrent maintenance manager instructs the hardware driver for IOP1 to remove IOA1 from its resource table. Next, in block 160, the hardware driver for IOP1 notifies the hardware driver for IOA1 of its removal from the system. The hardware driver for IOA1 quiesces itself accordingly.

Next, in block 162, the hardware driver for IOP1 sends a "remove resource" command to its associated IOP1 instructing IOP1 to remove IOA1 from its resource tables and internal state. Next, the concurrent maintenance manager invokes the bus manager to relinquish ownership of the slot for IOA1 (here slot 2) from IOP1. In response, in block 166, the bus manager notifies IOP1 to relinquish ownership of IOA1. Then, in block 168, the concurrent maintenance manager invokes the bus manager to assign the slot for IOA1 to IOP2, and in response, in block 170, the bus manager notifies IOP2 to take ownership of IOA1.

Next, in block 172, IOP2 sends a "resource alteration add" command to the IOP2 hardware driver, indicating the acquisition of IOA1 by IOP2. Then, in block 174, the hardware driver for IOP2 notifies the hardware driver for IOA1 of its online status, supplying VPD information thereto. In response, in block 176, the IOA1 hardware driver updates its configuration files with its new address and owning IOP, and in block 178, the jobs that were ended in block 152 are restarted. All components are then active, and routine 150 is complete.

FIG. 11 illustrates an exemplary display 114 that may be utilized by a user to reassign an IOA to another IOP dynamically. As shown in this figure, a user has selected the IOA resource in card position C08, as indicated in the "selected resource" section to be unbound from IOP CMB04 and bound to IOP CMB03. The IOP designated by the ">" symbol is the current owner, and the IOP designated by the "*" symbol is the system default owner. The user indicates the new IOP to which he or she wishes to assign the IOA by typing option 7 on the line for the IOP CMB03.

Figure 12:
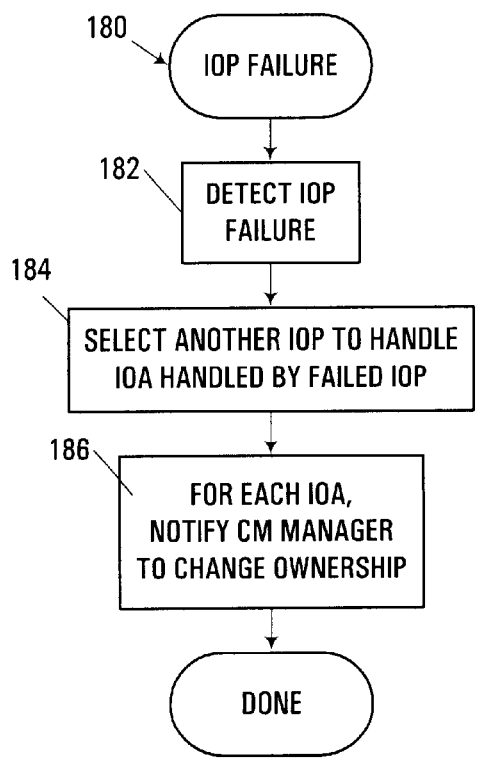
FIG. 12 is a flowchart illustrating the program flow of an IOP failure handling routine executed by the computer of FIG. 1.

As discussed above, in addition to being manually activated in response to user input, dynamic binding of an IOA to an IOP can also occur eprogrammatically—that is, in response to program commands from an application or other computer program executing on apparatus 10. As shown in FIG. 12, for example, failure of an IOP can be detected and automatically handled by an IOP failure routine 180, executed, for example, by the hardware driver for the failing IOP. In addition, detection of an IOP failure may also occur via various other software or hardware mechanisms through the use of timeouts of various operations. For example, the bus manager may not receive a response in the allowed time to a request to open or close a logical connection to the physical IOP. Similarly, hardware drivers for disk units may not receive a response to a disk read or write in the allowed time. Or, the IOP microcode may detect the failure and notify the system. Typically, the real or suspected IOP failure is reported to the IOP's hardware driver to handle all recovery actions, of which reassigning IOA's may be one.

As shown in FIG. 12, IOP failure routine 180 initially detects an IOP failure as represented at block 182. Then, in block 184, another IOP is selected to handle each IOA handled by the failed IOP. Any number of algorithms may be utilized to select another IOP, including, for example, random selections, load balancing selections, or the system default rules utilized in the apparatus. Once a suitable IOP has been selected for each IOA, block 186 then notifies the concurrent maintenance manager to change the ownership of each IOA, typically through the same programming interface supported between user component 52 and concurrent maintenance manager 54. Thus, for each IOA, the operations performed in IOA reassignment routine 150 of FIG. 10 are initiated starting at block 156 thereof. In the alternative, routine 180 could utilize a programming interface in user interface 52.

In addition, block 186 may also be required to automatically end any jobs using IOA1 prior to initiating IOA reassignment and/or automatically restart jobs after IOA reassignment. In the alternative, jobs using the IOA's assigned to a failing IOP may stop on their own due to the IOP failure and/or the jobs may periodically attempt restarts at predetermined intervals.

Once each IOA has been reassigned to another IOP, routine 180 is complete.

Figure 13:
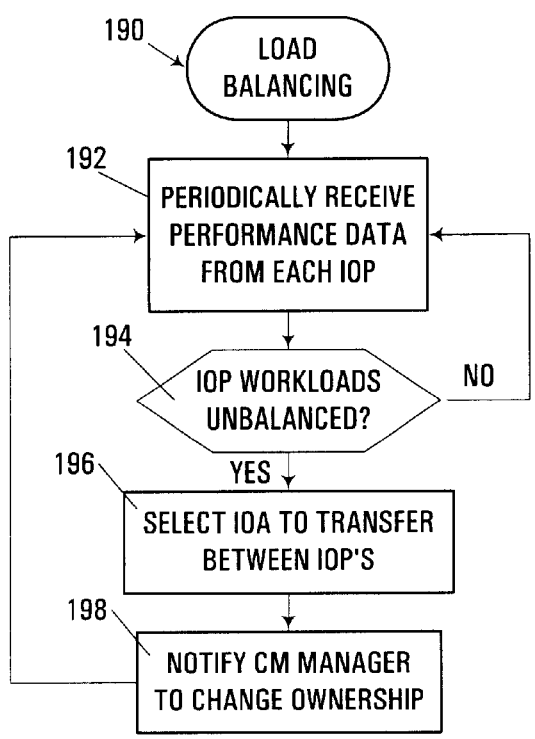
FIG. 13 is a flowchart illustrating the program flow of a load balancing routine executed by the computer of FIG. 1.

Another programmatic interface that may utilize dynamic IOA reassignment is to balance work loads and maximize performance in apparatus 10. As shown in FIG. 13, for example, a load balancing routine 190 is illustrated, which may be performed, for example, by a performance monitor daemon or job that periodically monitors the performance of the I/O interface and attempts to maximize the performance thereof. Routine 190 begins in block 192 by periodically receiving performance data from each IOP. Such performance data may include, for example, IOP processor utilization. Next, in block 194, it is determined whether the IOP work loads are significantly unbalanced. Various algorithms may be utilized in block 194 to determine such a condition. For example, an unbalanced condition may be detected when the utilization of one IOP is greater than a given threshold while the utilization of another IOP is below another threshold. If the work loads are not determined to be unbalanced, control returns to block 192 to continue monitoring the performance data at periodic intervals. If the IOP work loads are unbalanced, however, control passes to block 196 to select one or more IOA's to transfer between IOP's. As with IOP failure, various algorithms may be utilized to determine which IOA's should be assigned to which IOP's. For example, a random selection may be utilized, as well as a more complex algorithm that attempts to estimate the work loads that would occur if one or more IOA's were transferred to other IOP's, selecting the configuration that best balances the work loads. Other algorithms may be utilized in the alternative.

Once one or more IOA's have been selected to transfer between IOP's, control passes to block 198 to notify the concurrent maintenance manager to change the ownership of each such IOA. As with an IOP failure, block 198 typically initiates the IOA reassignment operations illustrated in routine 150 utilizing the program interface for the concurrent maintenance manager to initiate the operation starting at block 156 (FIG. 10). Once all IOA's have been transferred, control returns to block 192 to continue to monitor performance data. Routine 190 is then complete.

By providing dynamic bindings between IOP's and IOA's, the need to physically access apparatus 10 is often eliminated, and also makes powering off and/or rebooting parts or all of apparatus 10 unnecessary. As such, the maximum interruption in availability of apparatus 10 is the termination or suspension of any jobs utilized by an IOA being transferred between IOP's. As a consequence, system availability, reliability, performance and maintainability can all be improved through the use of dynamic binding consistent with the invention.

Various additional modifications to the embodiments described herein will become apparent to one of ordinary skill in the art. Therefore, the invention lies in the claims hereinafter appended.

What is claimed is:

1. An apparatus, comprising:
    (a) a processing complex including a system processor coupled to a memory;
    (b) an input/output (I/O) interface configured to interface the processing complex with a plurality of peripheral components, the I/O interface including a plurality of input/output processors (IOP's) and a plurality of input/output adaptors (IOA's) arranged in a hierarchical arrangement; and
    (c) a program resident in the memory and configured to dynamically reassign a first IOA in the plurality of IOA's from a first IOP in the plurality of IOP's to a second IOP in the plurality of IOP's such that the second IOP takes over management of data transfer between the processing complex and the first IOA from the first IOP, wherein the program is further configured to maintain at least partial system availability in the apparatus during dynamic reassignment of the first IOA.

2. The apparatus of claim 1, wherein the program is configured to dynamically reassign the first IOA to the second IOP responsive to user input.

3. The apparatus of claim 1, wherein the program is configured to dynamically reassign the first IOA to the second IOP responsive to a failure detected for the first IOP.

4. The apparatus of claim 1, wherein the program is configured to dynamically reassign the first IOA to the second IOP responsive to monitored system performance.

5. The apparatus of claim 4, wherein the program is further configured to dynamically reassign the first IOA to the second IOP responsive to monitored system performance by detecting an imbalance in respective workloads of the plurality of IOP's.

6. The apparatus of claim 1, wherein the I/O interface includes a system I/O bus with a plurality of slots, with each IOP and IOA coupled to a separate slot in the system I/O bus, and wherein the program is configured to dynamically reassign the first IOA to the second IOP without requiring a change in the slot to which any IOA or IOP is coupled in the I/O interface.

7. The apparatus of claim 6, wherein the program comprises a bus manager configured to manage the system I/O bus and a concurrent maintenance manager coupled to the bus manager and configured to manage maintenance operations for the I/O interface.

8. The apparatus of claim 1, wherein the program is configured to assign the first IOA to the first IOP prior to dynamic reassignment.

9. The apparatus of claim 8, wherein the program is configured to assign the first IOA to the first IOP responsive to activation of the first IOA in the apparatus, and wherein the program is further configured to interact with a user to select the first IOP from the plurality of IOP's responsive to activation of the first IOA.

10. The apparatus of claim 8, wherein the program is configured to assign the first IOA to the first IOP responsive to activation of the first IOP in the apparatus, and wherein the program is further configured to interact with a user to select the first IOA from the plurality of IOA's responsive to activation of the first IOP.

11. A method of managing an input/output (I/O) interface that interfaces a processing complex of a computer with a plurality of peripheral components, the I/O interface including a plurality of input/output processors (IOP's) and a plurality of input/output adaptors (IOA's) arranged in a hierarchical arrangement, the method comprising:
    (a) assigning a first IOA in the plurality of IOA's to a first IOP in the plurality of IOP's such that the first IOP manages data transfer between the processing complex and the first IOA; and
    (b) dynamically reassigning the first IOA to a second IOP in the plurality of IOP's while maintaining at least partial system availability such that the second IOP takes over management of data transfer between the processing complex and the first IOA from the first IOP.

12. The method of claim 11, wherein dynamically reassigning the first IOA to the second IOP is performed responsive to user input.

13. The method of claim 11, wherein dynamically reassigning the first IOA to the second IOP is performed responsive to a failure detected for the first IOP.

14. The method of claim 11, wherein dynamically reassigning the first IOA to the second IOP is performed responsive to monitored system performance.

15. The method of claim 14, further comprising detecting an imbalance in respective workloads of the plurality of IOP's, wherein dynamically reassigning the first IOA to the second IOP is performed responsive to a detected workload imbalance.

16. The method of claim 11, wherein the I/O interface includes a system I/O bus with a plurality of slots, wherein each IOP and IOA is coupled to a separate slot in the system I/O bus, and wherein dynamically reassigning the first IOA to the second IOP is performed without requiring a change in the slot to which any IOA or IOP is coupled in the I/O interface.

17. The method of claim 11, wherein assigning the first IOA to the first IOP is performed in response to activation of the first IOA in the computer, the method further comprising interacting with a user to select the first IOP from the plurality of IOP's responsive to activation of the first IOA.

18. The method of claim 11, wherein assigning the first IOA to the first IOP is performed in response to activation of the first IOP in the computer, the method further comprising interacting with a user to select the first IOA from the plurality of IOA's responsive to activation of the first IOP.

19. A program product, comprising:

(a) a program for use in the management of an input/output (I/O) interface that interfaces a processing complex of a computer with a plurality of peripheral components, the I/O interface including a plurality of input/output processors (IOP's) and a plurality of input/output adaptors (IOA's) arranged in a hierarchical arrangement, the program configured to dynamically reassign a first IOA in the plurality of IOA's from a first IOP in the plurality of IOP's to a second IOP in the plurality of IOP's such that the second IOP takes over management of data transfer between the processing complex and the first IOA from the first IOP, and the program further configured to maintain at least partial system availability in the apparatus during dynamic reassignment of the first IOA; and (b) a signal bearing media bearing the program.

20. The program product of claim 19, wherein the signal bearing media includes at least one of a recordable media and a transmission type media.

* * * * *

UNITED STATES PATENT AND TRADEMARK OFFICE
CERTIFICATE OF CORRECTION

PATENT NO.    : 6,529,978 B1
DATED         : March 4, 2003
INVENTOR(S)   : Curtis Shannon Eide et al.

It is certified that error appears in the above-identified patent and that said Letters Patent is hereby corrected as shown below:

<u>Title page, Item [54] and Column 1, lines 1-3,</u>
Replace title in it's entirety with the following:
-- COMPUTER INPUT/OUTPUT (I/O) INTERFACE WITH DYNAMIC I/O ADAPTOR TO I/O PROCESSOR BINDINGS --

Signed and Sealed this

Twenty-second Day of July, 2003

JAMES E. ROGAN
*Director of the United States Patent and Trademark Office*